(12) United States Patent
Li et al.

(10) Patent No.: US 11,496,787 B2
(45) Date of Patent: Nov. 8, 2022

(54) INFORMATION PROCESSING METHOD AND DEVICE, ELECTRONIC DEVICE, AND STORAGE MEDIUM

(71) Applicant: BEIJING DAJIA INTERNET INFORMATION TECHNOLOGY CO., LTD., Beijing (CN)

(72) Inventors: Meizhuo Li, Beijing (CN); Yong Duan, Beijing (CN)

(73) Assignee: BEIJING DAJIA INTERNET INFORMATION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/139,870

(22) Filed: Dec. 31, 2020

(65) Prior Publication Data
US 2021/0258627 A1    Aug. 19, 2021

(30) Foreign Application Priority Data

Feb. 13, 2020   (CN) .......................... 202010090845.X (51) Int. Cl.
  *H04N 21/2743*   (2011.01)
  *H04N 21/2187*   (2011.01)
  *H04N 21/4784*   (2011.01)

(52) U.S. Cl.
  CPC ..... *H04N 21/2743* (2013.01); *H04N 21/2187* (2013.01); *H04N 21/4784* (2013.01)

(58) Field of Classification Search
  CPC ........... H04N 21/2743; H04N 21/2187; H04N 21/4784; H04N 21/4126; H04N 21/4788;
(Continued)

(56) References Cited

U.S. PATENT DOCUMENTS

| 10,271,079 B1 | 4/2019 | Woschank et al. |
| 2006/0174207 A1* | 8/2006 | Deshpande .......... G06Q 10/107 715/758 |

(Continued)

FOREIGN PATENT DOCUMENTS

| CN | 106454537 A | 2/2017 |
| CN | 106685971 A | 5/2017 |

(Continued)

OTHER PUBLICATIONS

Chen, Yasheng et al., "The Business Model of Live Streaming Entertainment Services in China and Associated Challenges for Key Stakeholders," IEEE Access, vol. 7, Aug. 28, 2019, pp. 116321-116327.

(Continued)

*Primary Examiner* — Cynthia M Fogg
*Assistant Examiner* — Adil Ocak
(74) *Attorney, Agent, or Firm* — Foley & Lardner LLP (57) ABSTRACT

A method for processing information, applied to a first client, is disclosed. The method includes displaying a live broadcast page of a first user account for a live broadcast. The first user account is logged into the first client and includes a live broadcast function. The method includes obtaining a first information in the live broadcast page. The first information is sent from the first user account to a second user account, the second user account comprises the live broadcast function and is in a different live broadcast room than the first user account. The method includes sending the first information.

16 Claims, 5 Drawing Sheets

(58) Field of Classification Search
CPC ............... H04N 21/235; H04N 21/431; H04N 21/4312; H04N 21/435; H04N 21/439; G10L 15/22; G10L 2015/223
See application file for complete search history.

(56) References Cited

U.S. PATENT DOCUMENTS

| | | |
|---|---|---|
| 2013/0074129 A1 | 3/2013 | Reisman |
| 2014/0297811 A1* | 10/2014 | Stevens ............... H04L 65/4076 709/219 |
| 2016/0277802 A1* | 9/2016 | Bernstein ............. H04N 21/431 |
| 2016/0286244 A1 | 9/2016 | Chang et al. |
| 2018/0098028 A1* | 4/2018 | Mu .................... H04N 21/4788 |
| 2018/0234738 A1 | 8/2018 | Sarkar et al. |

FOREIGN PATENT DOCUMENTS

| | | |
|---|---|---|
| CN | 109246442 A | 1/2019 |
| CN | 110287399 A | 9/2019 |
| CN | 110324652 A | 10/2019 |
| CN | 110446064 A | 11/2019 |

OTHER PUBLICATIONS

Chinese Office Action dated Jun. 28, 2021, from application No. 202010090845.X, 27 pages.
Extended European Search Report dated Jun. 17, 2021, from application No. 21156996.7, 12 pages.
Lu, Zhicong et al., "You Watch, You Give, and You Engage: A Study of Live Streaming Practices in China," Arxiv.org, Cornell University Library, NY 14853, Mar. 16, 2018, 13 pages.
Notification to Grant Patent Right for Invention dated Jan. 10, 2022, from Chinese application No. 202010090845.X, 6 pages.

* cited by examiner

INFORMATION PROCESSING METHOD AND DEVICE, ELECTRONIC DEVICE, AND STORAGE MEDIUM

CROSS-REFERENCE TO RELATED APPLICATIONS

This application is based upon and claims priority to Chinese Patent Application No. 202010090845.X, filed on Feb. 13, 2020, the disclosure of which is incorporated herein by reference in its entirety.

TECHNICAL FIELD

The disclosure relates to the field of Internet technologies, and in particular to an information processing method and device, a client and a storage medium.

BACKGROUND

With the rapid development of Internet technologies, the live webcast industry has gradually become a new Internet cultural industry. Host users can broadcast live videos through mobile terminals and play wonderful programs for other users. However, users can interact with the host user only when they are watching the live picture broadcast by the host user. The efficiency of the interaction between the users and the host user may be low and inconvenient.

SUMMARY

According to a first aspect of arrangements of the disclosure, there is provided an information processing method applied to a first client. The method includes displaying a live broadcast page of a first user account for a live broadcast. The first user account is logged into the first client and includes an account with a live broadcast function. The method includes obtaining first information in the live broadcast page. The first information is sent from the first user account to a second user account, the second user account includes the live broadcast function, and is in a different live broadcast room from that of the first user account. The method includes sending the first information.

According to a second aspect of arrangements of the disclosure, there is provided an information processing method applied to a server. The method includes obtaining first information to be sent from a first user account to a second user account. The first user account and the second user account include a live broadcast function, the second user account is in a different live broadcast room from that of the first user account, and the first information is obtained in a live broadcast page of the first user account for a live broadcast by a first client, and the first user account is logged into the first client. The method includes sending displaying information including the first information to a second client. The second user account is logged into the second client.

According to a third aspect of arrangements of the disclosure, there is provided an information processing method applied to a second client. The method includes receiving displaying information sent by a server. The displaying information includes first information which is sent by a first client and is received by the server, the first information is sent from a first user account logged into the first client to a second user account that is obtained by the first client in a live broadcast page of the first user account for a live broadcast, the first user account includes a live broadcast function, and the second user account is in a different live broadcast room from that of the first user account; and displaying the displaying information.

According to a fourth aspect of arrangements of the disclosure, there is provided an information processing method applied to a third client. The method includes displaying a live broadcast picture for live broadcast of a second user account that is watched by a third user account logged into the third client. The second user account includes a live broadcast function; and displaying information when the displaying information sent by a server is received. The displaying information includes first information which is sent by a first client and is received by the server, the first information is sent from a first user account logged into the first client to a second user account that is obtained by the first client in a live broadcast page of the first user account for a live broadcast, the first user account is includes a live broadcast function, and the second user account is in a different live broadcast room from that of the first user account.

According to a fifth aspect of arrangements of the disclosure, there is provided an information processing device which is applied to a first client. The device includes a display module configured to display a live broadcast page of a first user account for a live broadcast. The device includes the first user account is logged into the first client, and includes a live broadcast function. The device includes an obtaining module configured to obtain first information in the live broadcast page. The first information is sent from the first user account to a second user account, the second user account includes a live broadcast function, and is in a different live broadcast room from that of the first user account. The device includes a sending module configured to send the first information.

According to a sixth aspect of arrangements of the disclosure, there is provided an information processing device which is applied to a server. The device includes an obtaining module configured to obtain first information to be sent from a first user account to a second user account. The first user account and the second user account includes a live broadcast function, the second user account is in a different live broadcast room from that of the first user account, and the first information is obtained in a live broadcast page of the first user account for a live broadcast by a first client, and the first user account is logged into the first client. The device includes a first sending module configured to send displaying information including the first information to a second client. The second user account is logged into the second client.

According to a seventh aspect of arrangements of the disclosure, there is provided an information processing device which is applied to a second client. The device includes a receiving module configured to receive displaying information sent by a server. The displaying information includes first information which is sent by a first client and is received by the server, the first information is sent from a first user account logged into the first client to a second user account and is obtained by the first client in a live broadcast page of the first user account for a live broadcast, the first user account includes a live broadcast function, and the second user account is in a different live broadcast room from that of the first user account. The device includes a display module configured to display the displaying information.

According to an eighth aspect of arrangements of the disclosure, there is provided an information processing device which is applied to a third client. The device includes a first display module configured to display a live broadcast picture for a live broadcast of a second user account that is watched by a third user account logged into the third client. The second user account is an account with a live broadcast function. The device includes a second display module configured to display displaying information when the displaying information sent by a server is received. The displaying information includes first information which is sent by a first client and is received by the server, the first information is sent from a first user account logged into the first client to a second user account and is obtained by the first client in a live broadcast page of the first user account for a live broadcast, the first user account includes a live broadcast function, and the second user account is in a different live broadcast room from that of the first user account.

According to a ninth aspect of arrangements of the disclosure, there is provided an electronic device including a processor, and a memory for storing instructions executable by the processor. The processor is configured to execute the instructions to implement the information processing method according to the first aspect, the second aspect, the third aspect, or the fourth aspect. According to a tenth aspect of arrangements of the disclosure, there is provided a storage medium having therein instructions which, when being executed by a processor of an electronic device, cause the electronic device to perform the information processing method according to the first aspect, the second aspect, the third aspect, or the fourth aspect.

According to an eleventh aspect of arrangements of the disclosure, there is provided a computer program product having therein instructions which, when being executed by a processor of an electronic device, cause the electronic device to perform the information processing method according to the first aspect, the second aspect, the third aspect, or the fourth aspect.

It should be understood that the above general description and the following detailed description are only exemplary and explanatory, and do not limit the disclosure.

DETAILED DESCRIPTION

In order to enable those of ordinary skill in the art to better understand the technical solutions of the disclosure, the technical solutions in the arrangements of the disclosure will be described clearly and completely below with reference to the accompanying drawings.

It should be noted that the terms of "first", "second", etc. in the specification and claims of the disclosure and the above-mentioned drawings are used to distinguish similar objects, and not necessarily used to describe a specific sequence or order. It should be understood that the terms used in this way can be interchanged under appropriate circumstances so that the arrangements of the disclosure described herein can be implemented in an order other than those illustrated or described herein. The implementations described in the following exemplary arrangements do not represent all implementations consistent with the disclosure. Rather, they are only examples of devices and methods consistent with some aspects of the present disclosure as detailed in the appended claims.

In related technologies, the host user who is performing live broadcast can interact with another host user only when he exits his live broadcast room, which results in low interaction efficiency between users.

Figure 1:
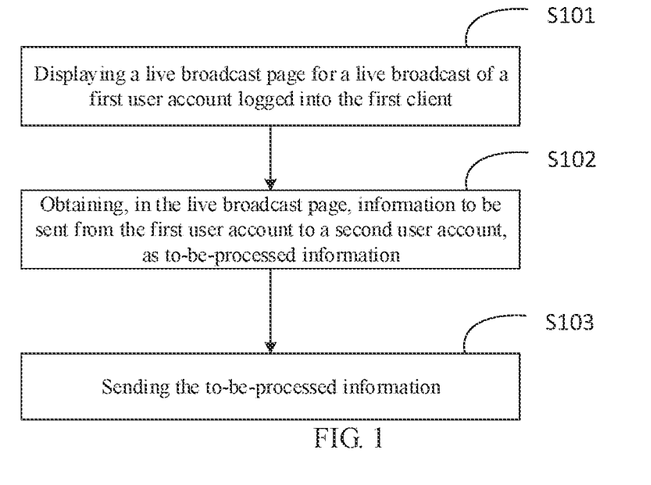
FIG. 1 is a flow chart showing an information processing method according to an exemplary arrangement.

In order to solve the above problems, the arrangements of the disclosure provide an information processing method, which can be applied to a first client. The first client can be a client into which a user account with a live broadcast function logs, and the user account can perform live broadcast through the first client. For example, the first client may be a smart device such as a mobile phone or a tablet computer installed with a live broadcast application. Referring to FIG. 1, the method can include the following operations.

In S101, displaying a live broadcast page for a live broadcast of a first user account logged in to the first client.

The first client can display the live broadcast page for the live broadcast of the first user account logged in to the first client. The first user account is an account with a live broadcast function.

In S102, obtaining first information in the live broadcast page. The first information is sent from the first user account to a second user account.

The first client can obtain the first information. The second user account is an account with the live broadcast function, and the second user account and the first user account are in different live broadcast rooms.

In S103, sending the first information.

The first client can send the first information. Based on the above process, during the live broadcast of the first user account, the first user account can directly interact with other user accounts in different live broadcast rooms without exiting the current live broadcast room, which improves the interaction efficiency between users.

In S101, the user account logged into the first client (i.e., the first user account) can create a live broadcast room through the first client, perform live broadcast in the created live broadcast room, and interact with other user accounts that enter the live broadcast room.

The first client may display the live broadcast page for the live broadcast of the first user account when the first user account is performing live broadcast. The live broadcast page for the live broadcast of the first user account may display a live broadcast picture for the live broadcast of the first user account and content of comments posted by other user accounts in the live broadcast room. Accordingly, the first user account can interact with other user accounts based on the content displayed on the live broadcast page.

In S102, during the live broadcast of the first user account, the first user account can interact with other user accounts in different live broadcast rooms (that is, second user account in the arrangements of the disclosure).

In one way, when the first user account is performing live broadcast, the first user account can present virtual gifts to other user accounts.

Alternatively, when the first user account is performing live broadcast, the first user account can send images or text to other user accounts. For example, the first user account can send information such as "the second user account, corner on" and "the second user account, you are the best" to the second user account.

The first user account can input the information that is to be sent to the second user account (that is, the first information in the arrangement of the disclosure) to the first client in different ways, and thus the first client can obtain the first information.

In S103, the first client may send the first information to a server, and in turn, the server may send displaying information including the first information to a second client into which the second user account logs, and the second client may display the displaying information.

The displaying information is to be displayed by the second client. The second client can be a smart device such as a mobile phone or a tablet installed with a live broadcast application. The second user account can perform live broadcast through the second client, and can also watch the live broadcasts of other user accounts through the second client.

In an arrangement, S102 may include operations of receiving a voice message input by the first user account through a preset voice portal in the live broadcast page; and extracting from the voice message the information to be sent from the first user account to the second user account, as to-be-processed information, that is, the first information.

In an arrangement of the disclosure, a preset voice portal may be provided in the live broadcast page for the live broadcast of the first user account displayed by the first client, the first user account may input a voice message to the first client through the preset voice portal, and the first client can obtain the voice message input by the first user account and extract the to-be-processed information from the voice message. For example, the preset voice portal may be a voice assistant set in the live broadcast page for the live broadcast of the first user account. If the first user account wants to present flowers to the second user account, the first user account may input a voice message of "Voice assistant, please present 10 flowers to the second user account" through a microphone of the first client. Correspondingly, the first client can obtain the voice message input by the first user account, and the to-be-processed information extracted includes "10 flowers".

In an arrangement, S102 may include generating information corresponding to a preset information sending control in the live broadcast page as the to-be-processed information to be sent from the first user account to the second user account when it is detected that the preset information sending control is triggered by the first user account.

In an arrangement of the disclosure, the preset information sending control may be provided in the live broadcast page for the live broadcast of the first user account displayed by the first client, and the first user account may click on the control to instruct the first client to send the to-be-processed information to the second user account. For example, the preset information sending control may be a "Send Gift" button set on the live broadcast page for the live broadcast of the first user account. If the first user account wants to give 10 virtual flowers to the second user account, the first user account can click on the "Send Gift" button. Correspondingly, the first client can display the virtual gifts that the first user account can present, and the first user account can select the virtual flowers to be presented, and select the number of gifts to be presented to be 10. Accordingly, the first client can generate corresponding to-be-processed information.

In an arrangement, if the to-be-processed information represents a virtual gift presented by the first user account to the second user account, the to-be-processed information may include an identification and quantity of the virtual gift to be presented by the first user account.

In an arrangement, the to-be-processed information may include an image and/or text to be sent by the first user account to the second user account. Correspondingly, S102 may include obtaining in the live broadcast page the text input by the first user account to be sent to the second user account and/or the image uploaded by the first user account to be sent to the second user account, as the to-be-processed information.

The image uploaded by the first user account may be a picture or a video.

In an arrangement of the disclosure, the first user account can input text or upload an image in the live broadcast page, and select to send the same to the second user account. Accordingly, the first client can obtain the text input and/or the image uploaded by the first user account, as the to-be-processed information.

In an arrangement, after S103, the method may further include determining that the second user account has received the to-be-processed information when a confirmation message sent by the second client into which the second user account logs is received.

In an arrangement of the disclosure, when the second client receives the displaying information including the to-be-processed information, the second client may send the confirmation message to the first client, and accordingly, the first client may determine that the second user account has received the to-be-processed information.

In an arrangement, when the second client receives and displays the displaying information, the second user account may also send a reply message to the first client through the second client, and correspondingly, the first client may receive and display the reply message. For example, the second client may send a reply message including "Thank you for your gift" to the first client, and accordingly, the first client may display "First user account: Thank you for your gift".

In addition, the first client can also display a reminder message. For example, the to-be-processed information indicates the virtual gift presented by the first user account to the second user account, and when the first client receives the confirmation message, the first client can display a reminder message of "The second user account has received your gift" on the live broadcast page.

Figure 2:
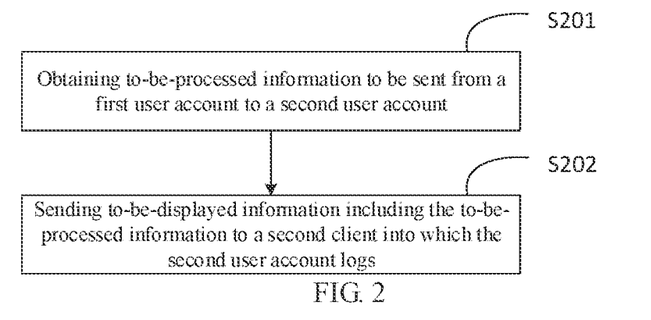
FIG. 2 is a flow chart showing an information processing method according to an exemplary arrangement.

In another aspect, the arrangements of the present disclosure also provide an information processing method which can be applied to a server. Referring to FIG. 2, the method may include the following operations.

In S201, obtaining first information to be sent from a first user account to a second user account.

The server can obtain the first information. The first information may be the to-be-processed information as described above. The first user account and the second user account are accounts with a live broadcast function, the second user account and the first user account are in different live broadcast rooms, and the first information is information obtained, by a first client into which the first user account logs, in a live broadcast page for a live broadcast of the first user account.

In S202, sending displaying information including the first information to a second client. The second user account is logged into the second client.

The server can send the displaying information to the second client. Based on the above process, during the live broadcast of the first user account, the first user account can directly interact with other user accounts in different live broadcast rooms without exiting the current live broadcast room, which improves the interaction efficiency between users.

In some arrangements, the method may further include sending the displaying information to clients into which user accounts in a live broadcast room of the first user account log and/or third clients into which user accounts in a live broadcast room of the second user account log.

The third client can be a smart device such as a mobile phone or a tablet computer installed with a live broadcast application. The user accounts logged into the third clients can watch the live broadcast of the second user account through the third clients.

In the arrangement of the disclosure, when the server receives the to-be-processed information, the server may generate the displaying information including the to-be-processed information.

For example, the to-be-processed information represents a virtual gift presented by the first user account to the second user account, and the displaying information may further include an identification of the first user account and an identification of the second user account.

In an implementation, the server may send the displaying information simultaneously to the second client, the third clients, and the clients into which the user accounts in the live broadcast room of the first user account log.

In another implementation, the server may send the displaying information successively to the second client, the third clients, and the clients into which the user accounts in the live broadcast room of the first user account log.

Accordingly, the clients that have received the displaying information can display the displaying information in their respective display interfaces.

It can be seen that based on the information processing method provided in the arrangements of the disclosure, the first user account can directly interact with other user accounts in different live broadcast rooms during the live broadcast process without exiting the current live broadcast room, which can improve the efficiency of the interaction between the users.

In an arrangement, the first information may include an identification and quantity of virtual gifts presented by the first user account to the second user account. Correspondingly, the displaying information may also include the identification of the first user account.

In addition, the displaying information may also include the identification of the second user account, and accordingly, the client that receives the displaying information may display "The first user account presents a virtual gift to the second user account".

In an arrangement, the first information includes an image and/or texts to be sent from the first user account to the second user account.

The image uploaded by the first user account may be a picture or a video.

In an arrangement of the disclosure, the first user account can input text or upload an image in the live broadcast page, and select to send the same to the second user account. Accordingly, the first client can obtain the text input and/or the image uploaded by the first user account as the to-be-processed information, and send the same to the server.

Figure 3:
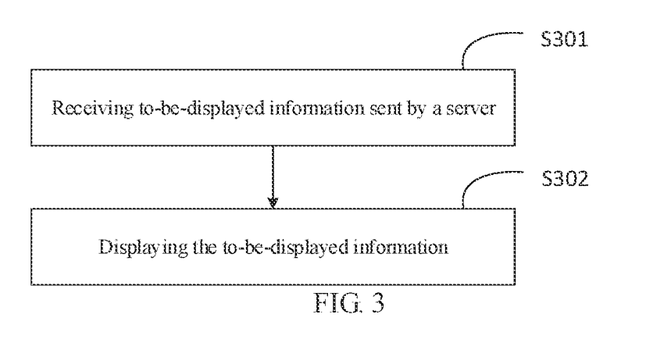
FIG. 3 is a flow chart showing an information processing method according to an exemplary arrangement.

In another aspect, the arrangements of the disclosure also provide an information processing method, which can be applied to a second client. Referring to FIG. 3, the method may include the following operations.

In S301, receiving displaying information sent by a server.

The second client can receive the displaying information. The displaying information includes first information which is sent by a first client and is received by the server, and the first information is information to be sent from a first user account logged into the first client to a second user account that is obtained by a first client in a live broadcast page for a live broadcast of the first user account. The first user account is an account with a live broadcast function, and the second user account and the first user account are in different live broadcast rooms. The first information can be the to-be-processed information as described above.

In S302, displaying the displaying information.

The second client can display the displaying information. Based on the above process, during the live broadcast of the first user account, the first user account can directly interact with other user accounts in different live broadcast rooms without exiting the current live broadcast room, which improves the efficiency of the interaction between users.

In an arrangement, the first information may include an identification and quantity of virtual gifts presented by the first user account to the second user account. Correspondingly, the displaying information may also include the identification of the first user account, and S302 may include displaying the identification of the first user account as well as the identification and the quantity of virtual gifts in a preset gift display scheme.

The preset gift display scheme can be set by a technician. For example, the gift display scheme can be a display scheme such as scroll display, static display, etc., and it can be displayed in a preset color.

In the arrangement of the present disclosure, if the first information represents a virtual gift presented by the first user account to the second user account, the displaying information received by the second client may include the identification of the first user account as well as the identification and quantity of the virtual gift. The second client can display the identification of the first user account as well as the identification and quantity of the virtual gift in the preset gift display scheme.

In an arrangement, the first information may include an image and/or text to be sent from the first user account to the second user account.

Correspondingly, the second client can display the image and/or text sent by the first user account.

In an arrangement, after S301, the method may further include sending a confirmation message indicating that the first information is received.

In the arrangement of the present disclosure, when the displaying information is received, it indicates that the second client has received the first information. In this case, the second client can send a confirmation message to the first client, and the server can receive the confirmation message and forward it to the first client, and accordingly, the first client can determine that the second client has received the first information according to the confirmation message.

Figure 4:
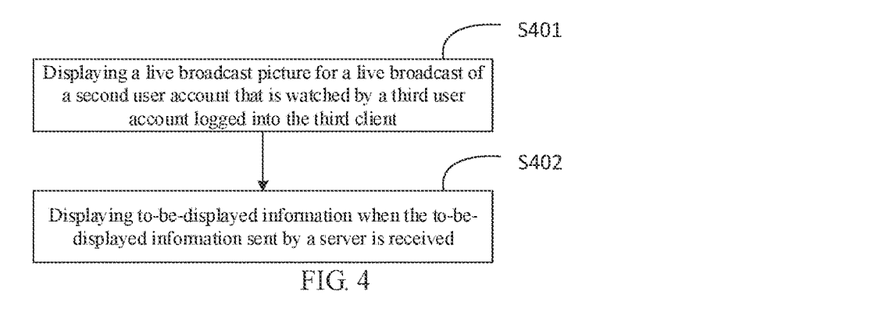
FIG. 4 is a flow chart showing an information processing method according to an exemplary arrangement.

In another aspect, the arrangements of the disclosure also provide an information processing method, which can be applied to a third client. Referring to FIG. 4, the method may include the following operations.

In S401, displaying a live broadcast picture for a live broadcast of a second user account watched by a third user account logged into the third client.

The third client can display the live broadcast picture. The second user account is an account with a live broadcast function.

In S402, displaying information when the displaying information sent by the server is received.

The third client can display the displaying information. The displaying information includes first information which is sent by a first client and is received by the server, and the first information is information to be sent from a first user account logged into the first client to a second user account that is obtained by the first client in a live broadcast page for a live broadcast of the first user account. The first user account is an account with a live broadcast function, and the second user account and the first user account are in different live broadcast rooms. The first information can be the to-be-processed information as described above.

Based on the above process, during the live broadcast of the first user account, the first user account can directly interact with other user accounts in different live broadcast rooms without exiting the current live broadcast room, which improves the efficiency of the interaction between users.

In an arrangement, the first information may include an identification and quantity of virtual gifts presented by the first user account to the second user account. The displaying information may also include an identification of the first user account, and accordingly, S402 may include displaying the identification of the first user account as well as the identification and the quantity of virtual gifts in a preset gift display scheme.

For this operation, reference may be made to the detailed explanation of S302, which will not be repeated here.

In S401, after the third user account logs into the third client, the third user account can enter the live broadcast room for the live broadcast of the second user account through the third client, and the third client can display a live broadcast picture for the live broadcast of the second user account. Accordingly, the third user account can watch the live broadcast of the second user account through the third client.

In S402, if the first user account that is performing live broadcast sends the first information to the second user account, the server can send displaying information including the first information to the third clients into which the user accounts that are watching the live broadcast of the second user account (that is, the third user accounts) log after receiving the to-be-processed information. Correspondingly, the third clients can receive and display the displaying information.

In an arrangement, the first information may include an image and/or text to be sent from the first user account to the second user account.

In an arrangement, the displaying information may further include the identification of the first user account. Accordingly, after S402, the method may further include jumping to display the live broadcast page for the live broadcast of the first user account when it is detected that the displayed identification of the first user account is triggered.

In the arrangement of the present disclosure, after the third user account views the displaying information displayed on the third client, if the third user account would like to enter the live broadcast room for the live broadcast of the first user account, the third user account can click on the identification of the first user account displayed on the third client. Correspondingly, the third client can detect that the displayed identification of the first user account is triggered by the third user account, and thus can jump to display the live broadcast picture for the live broadcast of the first user account.

Figure 5:
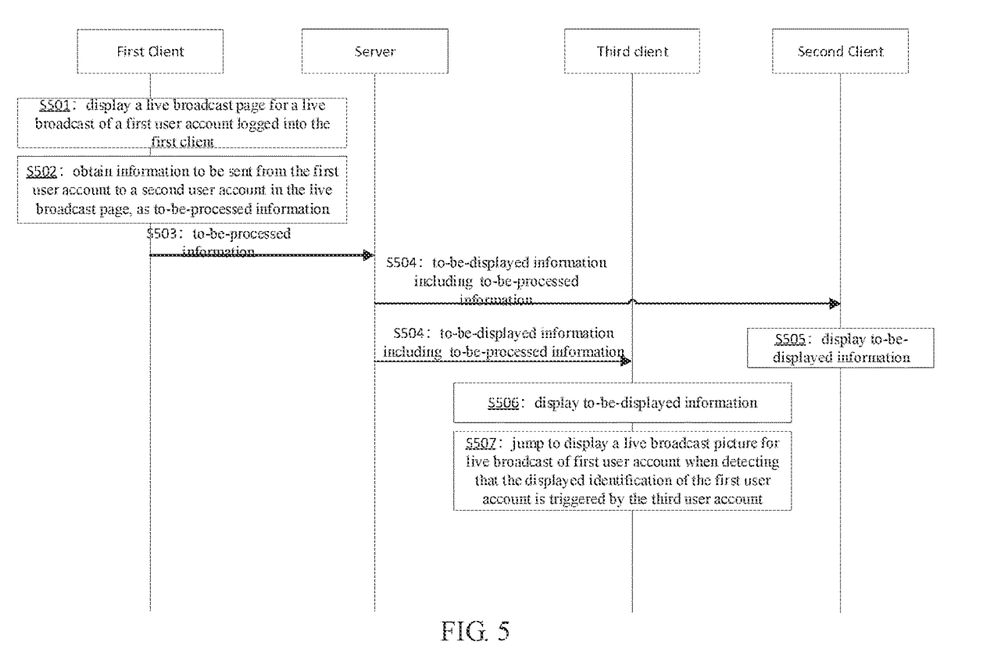
FIG. 5 is a flow chart showing an example of an information processing method according to an exemplary arrangement.

Referring to FIG. 5, FIG. 5 is a flowchart showing an example of an information processing method according to an exemplary arrangement. The method may include the following operations.

In S501, a first client displays a live broadcast page for a live broadcast of a first user account logged into the first client.

In S502, the first client obtains first information to be sent from the first user account to a second user account in the live broadcast page.

In S503: the first client sends the first information to a server.

In S504, the server sends displaying information including the first information to a second client into which second user account logs and a third client into which a third user account that is watching the live broadcast of the second user account logs.

The displaying information also includes an identification of the first user account.

In S505, the second client displays the displaying information.

In S506, the third client displays the displaying information.

In S507, it jumps to display a live broadcast picture for the live broadcast of the first user account when it is detected that the displayed identification of the first user account is triggered by the third user account.

Figure 6:
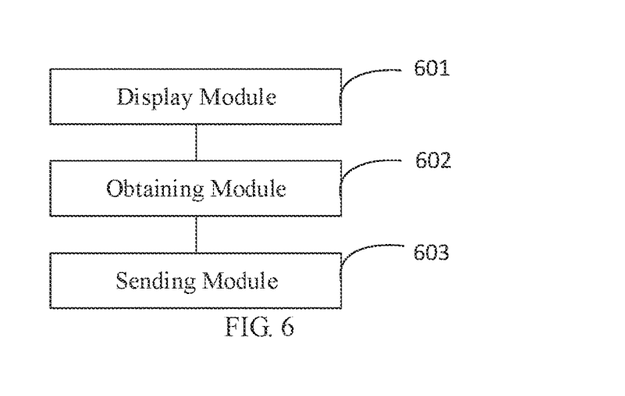
FIG. 6 is a structural diagram showing an information processing device according to an exemplary arrangement.

Based on the same inventive concept, refer to FIG. 6, which is a structural diagram of an information processing device according to an exemplary arrangement. The device is applied to a first client, and can include a display module 601, an obtaining module 602 and a sending module 603.

The display module 601 is configured to display a live broadcast page for a live broadcast of a first user account logged into the first client, where the first user account is an account with a live broadcast function.

The obtaining module 602 is configured to obtain first information in the live broadcast page, where the first information is sent from the first user account to a second user account, the second user account includes the live broadcast function, and is in a different live broadcast room from that of the first user account.

The sending module 603 is configured to send the first information.

In an arrangement, the obtaining module 602 is specifically configured to:

receive a voice message input by the first user account through a preset voice portal in the live broadcast page, and extract from the voice message the information to be sent from the first user account to the second user account, as the first information.

In an arrangement, the obtaining module 602 is specifically configured to generate information corresponding to a preset information sending control in the live broadcast page as the first information to be sent from the first user account to the second user account when it is detected that the preset information sending control is triggered by the first user account.

In an arrangement, the first information includes an identification and quantity of virtual gifts presented by the first user account to the second user account.

In an arrangement, the first information includes an image and/or text to be sent from the first user account to the second user account, and the obtaining module 602 is specifically configured to obtain in the live broadcast page the text input by the first user account to be sent to the second user account and/or the image uploaded by the first user account to be sent to the second user account, as the first information.

In an arrangement, the device further includes:

a determining module configured to determine that the second user account has received the first information when a confirmation message sent by a second client into which the second user account logs is received.

Figure 7:
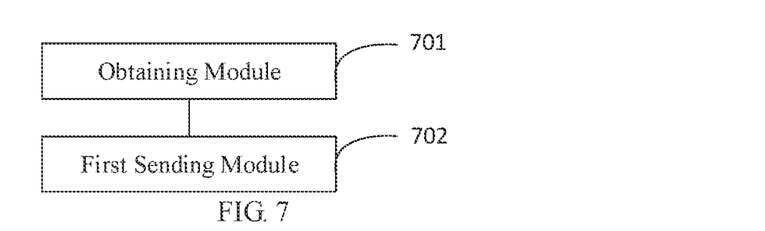
FIG. 7 is a structural diagram showing an information processing device according to an exemplary arrangement.

Based on the same inventive concept, refer to FIG. 7, which is a structural diagram of an information processing device according to an exemplary arrangement. The device is applied to a server, and can include an obtaining module 701 and a first sending module 702.

The obtaining module 701 is configured to obtain first information to be sent from a first user account to a second user account, where the first user account and the second user account include a live broadcast function, the second user account is in a different live broadcast room from that of the first user account, and the first information is obtained in a live broadcast page of the first user account for a live broadcast by a first client, and the first user account is logged into the first client.

The first sending module 702 is configured to send displaying information including the first information to a second client. The second user account is logged into the second client.

In an arrangement, the device further includes:

a second sending module configured to send the displaying information to clients into which user accounts in a live broadcast room of the first user account log and/or third clients into which user accounts in the live broadcast room of the second user account log.

In an arrangement, the first information includes an identification and quantity of virtual gifts presented by the first user account to the second user account, and the displaying information further includes an identification of the first user account.

In an arrangement, the first information includes an image and/or text to be sent from the first user account to the second user account.

Figure 8:
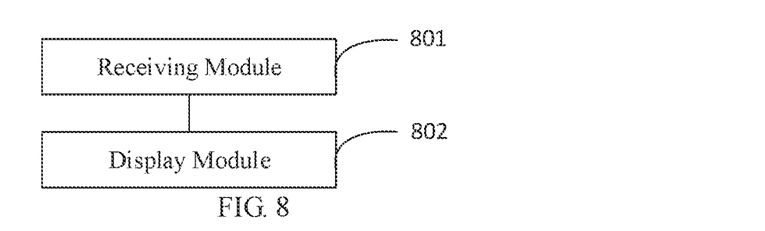
FIG. 8 is a structural diagram showing an information processing device according to an exemplary arrangement.

Based on the same inventive concept, refer to FIG. 8, which is a structural diagram of an information processing device according to an exemplary arrangement. The device is applied to a second client, and can include a receiving module 801 and a display module 802.

The receiving module 801 configured to receive displaying information sent by a server, where the displaying information includes first information which is sent by a first client and is received by the server, and the first information is sent from a first user account logged into the first client to a second user account and is obtained by the first client in a live broadcast page of the first user account for a live broadcast, the first user account includes a live broadcast function, and the second user account is in a different live broadcast room from that of the first user account.

The display module 802 is configured to display the displaying information.

In an arrangement, the first information includes an identification and quantity of virtual gifts presented by the first user account to the second user account, and the displaying information further includes an identification of the first user account.

The display module 802 is specifically configured to display the identification of the first user account as well as the identification and quantity of the virtual gifts in a preset gift display scheme.

In an arrangement, the first information includes an image and/or text to be sent from the first user account to the second user account.

In an arrangement, the device further includes:

a sending module configured to send a confirmation message indicating that the first information is received.

Figure 9:
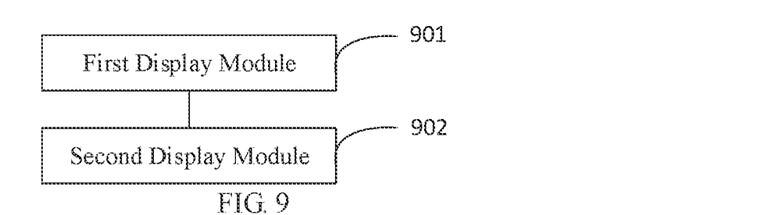
FIG. 9 is a structural diagram showing an information processing device according to an exemplary arrangement.

Based on the same inventive concept, refer to FIG. 9, which is a structural diagram of an information processing device according to an exemplary arrangement. The device is applied to a third client, and can include a first display module 901 and a second display module 902.

The first display module 901 is configured to display a live broadcast picture for a live broadcast of a second user account that is watched by a third user account logged into the third client, where the second user account includes a live broadcast function.

The Second Display Module 902 is configured to display displaying information when the displaying information sent by a server is received, where the displaying information includes first information which is sent by a first client and is received by the server, and the first information is information to be sent from a first user account logged into the first client to a second user account that is obtained by the first client in a live broadcast page for a live broadcast of the first user account, the first user account is an account with a live broadcast function, and the second user account is in a different live broadcast room from that of the first user account.

In an arrangement, the first information includes an identification and quantity of virtual gifts presented by the first user account to the second user account, and the displaying information further includes an identification of the first user account.

The second display module 902 is specifically configured to display the identification of the first user account as well as the identification and quantity of the virtual gifts in a preset gift display scheme.

In an arrangement, the first information includes an image and/or text to be sent from the first user account to the second user account.

In an arrangement, the displaying information further includes an identification of the first user account;

The device further includes:

a processing module configured to jump to display a live broadcast picture for a live broadcast of the first user account when it is detected that the displayed identification of the first user account is triggered.

Figure 10:
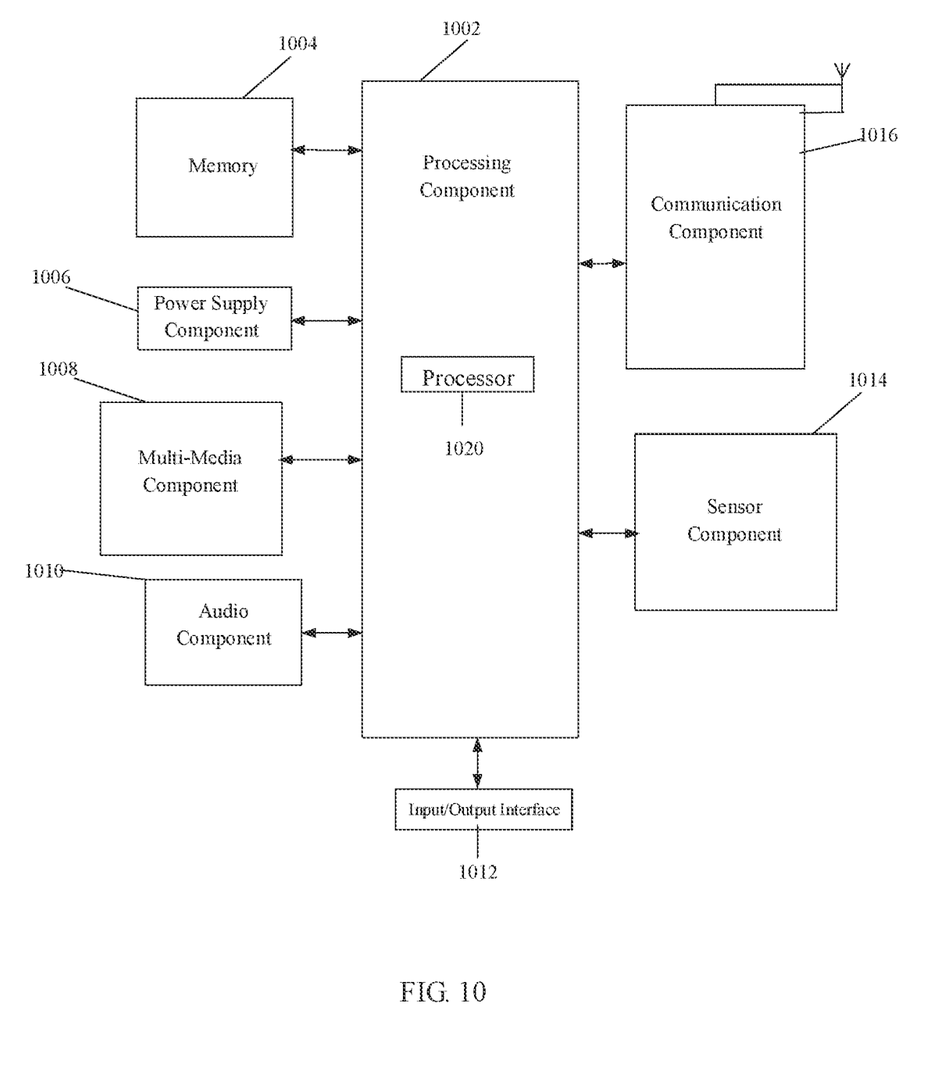
FIG. 10 is a structural diagram of an electronic device according to an exemplary arrangement.

FIG. 10 is a block diagram showing an electronic device for processing information according to an exemplary arrangement. For example, the electronic device may be a mobile phone, a computer, a digital broadcasting terminal, a messaging device, a game console, a tablet device, a medical device, a fitness device, a personal digital assistant, etc.

Referring to FIG. 10, the electronic device may include one or more of the following components: a processing component 1002, a memory 1004, a power supply component 1006, a multi-media component 1008, an audio component 1010, an input/output (I/O) interface 1012, a sensor component 1014, and a communication component 1016.

The processing component 1002 generally controls overall operations of the electronic device, such as operations associated with display, telephone calls, data communications, camera operations, and recording operations. The processing component 1002 may include one or more processors 1020 to execute instructions so as to implement all or part of the operations of the foregoing information processing methods applied to the client. In addition, the processing component 1002 may include one or more modules to facilitate the interaction between the processing component 1002 and other components. For example, the processing component 1002 may include a multi-media module to facilitate the interaction between the multi-media component 1008 and the processing component 1002.

The memory 1004 is configured to store various types of data to support operations on the electronic device. Examples of the data include instructions for any application or method operating on the electronic device, contact data, phone book data, messages, pictures, videos, etc. The memory 1004 can be implemented in any type of volatile or non-volatile storage device, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk and an optical disk, or a combination thereof.

The power supply component 1006 provides power to various components of the electronic device. The power supply component 1006 may include a power management system, one or more power supplies, and other components associated with generating, managing, and distributing power for the electronic device.

The multi-media component 1008 includes a screen that provides an output interface between the electronic device and the user. In some arrangements, the screen may include a Liquid Crystal Display (LCD) or a Touch Panel (TP). When the screen includes the touch panel, the screen can be implemented as a touch screen for receiving input signals from the user. The touch panel includes one or more touch sensors to sense gestures such as touching and sliding on the touch panel. The touch sensors can not only sense a boundary of the touching or sliding operation, but also detect a duration and pressure associated with the touching or sliding operation. In some arrangements, the multi-media component 1008 includes a front camera and/or a rear camera. When the electronic device is in an operation mode, such as a shooting mode or a video mode, the front camera and/or the rear camera can receive external multi-media data. Each of the front camera and the rear camera can be a fixed optical lens system or have focusing and optical zooming capabilities.

The audio component 1010 is configured to output and/or input audio signals. For example, the audio component 1010 includes a microphone (MIC). When the electronic device is in an operation mode, such as a call mode, a recording mode or a voice recognition mode, the microphone is configured to receive external audio signals. The received audio signals may be further stored in the memory 1004 or sent via the communication component 1016. In some arrangements, the audio component 1010 further includes a speaker for outputting the audio signals.

The I/O interface 1012 provides an interface between the processing component 1002 and a peripheral interface module. The peripheral interface module may be a keyboard, a click wheel, a button, or the like. The button may include but is not limited to a home button, a volume button, a start button, and a lock button.

The sensor component 1014 includes one or more sensors for providing various state evaluations of the electronic device. For example, the sensor component 1014 can detect an on/off state of the electronic device and relative positioning of a component such as a display or a keypad of the electronic device. The sensor component 1014 can also detect a position change of the electronic device or a component of the electronic device, presence or absence of contact with the electronic device by the user, orientation or acceleration/deceleration of the electronic device, and temperature changes of the electronic device. The sensor component 1014 may include a proximity sensor configured to detect presence of a nearby object without any physical contact. The sensor component 1014 may also include an optical sensor, such as a CMOS or CCD image sensor, for use in imaging applications. In some arrangements, the sensor component 1014 may also include an acceleration sensor, a gyroscope sensor, a magnetic sensor, a pressure sensor or a temperature sensor.

The communication component 1016 is configured to facilitate wired or wireless communication between the electronic device and other devices. The electronic device can access a wireless network based on a communication standard, such as a Wi-Fi, an operator network (e.g., 2G 3G 4G or 5G), or a combination thereof. In an exemplary arrangement, the communication component 1016 receives a broadcast signal or broadcast related information from an external broadcast management system via a broadcast channel. In an exemplary arrangement, the communication component 616 further includes a Near Field Communication (NFC) module to facilitate short-range communication. For example, the NFC module can be implemented based on a Radio Frequency Identification (RFID) technology, an Infrared Data Association (IrDA) technology, an Ultra-Wideband (UWB) technology, a Bluetooth (BT) technology or other technologies.

In an exemplary arrangement, the electronic device may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the above information processing methods applied to the client.

Figure 11:
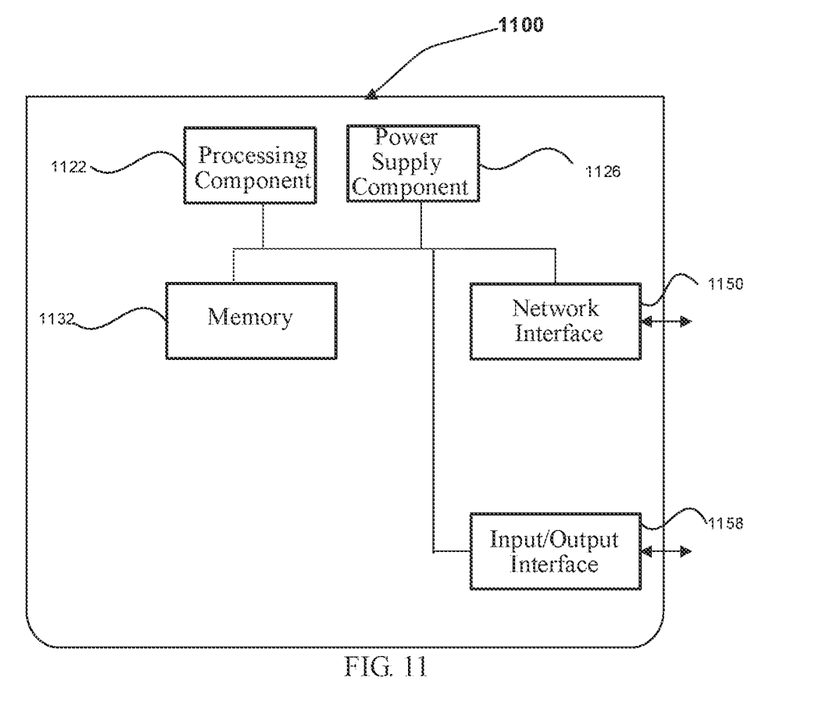
FIG. 11 is a structural diagram of an electronic device according to an exemplary arrangement.

FIG. 11 is a block diagram showing an electronic device 1100 for processing information according to an exemplary arrangement. For example, the electronic device 1100 may be provided as a server. Referring to FIG. 11, the electronic device 1100 includes a Processing Component 1122 which further includes one or more processors, and memory resources represented by a memory 1132 for storing instructions executable by the processing component 1122, such as an application program. The application program stored in the memory 1132 may include one or more modules each of which corresponds to a set of instructions. In addition, the processing component 1122 is configured to execute instructions to perform the aforementioned information processing method applied to the server.

The electronic device 1100 may also include a Power Supply Component 1126 configured to perform power management of the electronic device 1100, a wired or wireless network interface 1150 configured to connect the electronic device 1100 to a network, and an input/output (I/O) interface 1158. The electronic device 1100 can operate based on an operating system stored in the memory 332, such as Windows Server™, Mac OS X™, Unix™, Linux™, FreeBSD™ or similar operating systems.

In an exemplary arrangement, there is also provided a storage medium including instructions, for example, an electronic device including instructions, and the instructions may be executed by a processor of the electronic device to carry out the foregoing information processing methods. In an arrangement, the storage medium may be a non-transitory computer-readable storage medium, and the non-transitory computer-readable storage medium may be, for example, a ROM, a Random Access Memory (RAM), a CD-ROM, a magnetic tape, a floppy disk, an optical data storage device, etc.

After considering the description and practicing the disclosure disclosed herein, those skilled in the art will easily think of other arrangements of the present disclosure. This disclosure is intended to cover any variations, uses, or adaptive changes of the present disclosure that follow the general principles of the present disclosure and include common general knowledge or common technical means in the technical field which are not disclosed in the present disclosure. The description and arrangements shall be considered exemplary only, and the true scope and spirit of this disclosure are defined by the claims.

It should be understood that the present disclosure is not limited to the precise structures that have been described above and shown in the drawings, and various modifications and changes can be made without departing from the scope thereof. The scope of the present disclosure is defined only by the appended claims.

What is claimed is:

1. A method for processing information, applied to a first client, the method comprising:
    displaying a first live broadcast page of a first live broadcast room, wherein the first live broadcast room is created by a first user account for a live broadcast, and the first user account is logged into the first client and comprises a live broadcast function;
    obtaining a first information in the first live broadcast page, wherein the first information is sent from the first user account to a second user account that is hosting a live broadcast in a second live broadcast room, the second user account is logged into a second client and comprises the live broadcast function, the second live broadcast room is created by the second user account, and a second live broadcast page of the live broadcast hosted by the second user account in the second live broadcast room is displayed on the second client; and
    sending the first information.

2. The method according to claim 1, wherein said obtaining the first information comprises:
    receiving a voice message input by the first user account through a voice portal in the first live broadcast page; and
    extracting the first information from the voice message.

3. The method according to claim 1, wherein said obtaining the first information comprises:
    generating the first information in response to detecting that the first user account triggers an information sending control in the first live broadcast page, wherein the first information corresponds to the information sending control.

4. The method according to claim 1, wherein the first information comprises an identification and quantity of virtual gifts presented by the first user account to the second user account.

5. The method according to claim 1, wherein said obtaining the first information comprises:
    obtaining text information input by the first user account and/or images uploaded by the first user account, wherein the text information and the images are sent to the second user account; and
    determining the first information comprising the text information and/or the images.

6. The method according to claim 1, further comprising:
    determining that the second user account has received the first information in response to receiving acknowledge information from the second user account.

7. A method for processing information, applied to a server, the method comprising:
    obtaining a first information sent from a first user account to a second user account, wherein the first user account and the second user account comprise a live broadcast function, a first live broadcast room is created by the first user account for a live broadcast, a second live broadcast room is created by the second user account, the first information is obtained in a first live broadcast page of first live broadcast room, and the first user account is logged into the first client;
    sending displaying information comprising the first information to a second client, wherein the second user account is logged into the second client, the second user account is hosting a live broadcast in the second live broadcast room and a second live broadcast page of the live broadcast hosted by the second user account in the second live broadcast room is displayed on the second client.

8. The method according to claim 7, further comprising:
    in response to obtaining the first information, sending the displaying information to clients into which user accounts in the first live broadcast room of the first user account and the second live broadcast room of the second user account log.

9. The method according to claim 7, wherein the first information comprises an identification and quantity of virtual gifts presented by the first user account to the second user account, and the displaying information further comprises an identification of the first user account.

10. The method according to claim 7, wherein the first information comprises an image and/or text to be sent from the first user account to the second user account.

11. A terminal device, comprising:
    a processor; and
    a memory for storing instructions executable by the processor,
    wherein the processor is configured to execute the instructions to perform the following operations:
    displaying a first live broadcast page of a first live broadcast room, wherein the first live broadcast room is created by a first user account for a live broadcast, and the first user account is logged into the first client and comprises a live broadcast function;
    obtaining a first information in the first live broadcast page, wherein the first information is sent from the first user account to a second user account that is hosting a live broadcast in a second live broadcast room, the second user account is logged into a second client and comprises the live broadcast function, the second live broadcast room is created by the second user account, and a second live broadcast page of the live broadcast hosted by the second user account in the second live broadcast room is displayed on the second client; and
    sending the first information.

12. The terminal device according to claim 11, wherein said obtaining the first information comprises:
   receiving a voice message input by the first user account through a voice portal in the first live broadcast page; and
   extracting the first information from the voice message.

13. The terminal device according to claim 11, wherein said obtaining the first information comprises:
   generating the first information in response to detecting that the first user account triggers an information sending control in the first live broadcast page, wherein the first information corresponds to the information sending control.

14. The terminal device according to claim 11, wherein the first information comprises an identification and quantity of virtual gifts presented by the first user account to the second user account.

15. The terminal device according to claim 11, wherein said obtaining the first information comprises:
   obtaining text information input by the first user account and/or images uploaded by the first user account, wherein the text information and the images are sent to the second user account; and
   determining the first information comprising the text information and/or the images.

16. The terminal device according to claim 11, wherein the operations further comprise:
   determining that the second user account has received the first information in response to receiving acknowledge information from the second user account.

* * * * *